Patented Dec. 8, 1942

2,304,519

UNITED STATES PATENT OFFICE 2,304,519

PRODUCTION OF ANHYDROUS ALUMINUM SULPHATE

William S. Wilson, Brookline, Mass.

No Drawing. Application July 29, 1940, Serial No. 348,203

12 Claims. (Cl. 23—123)

This invention relates to the preparation of anhydrous aluminum sulphate and particularly to methods for dehydrating solid hydrous aluminum sulphate such as that now being produced commercially.

The customary method of manufacture of commercial aluminum sulphate involves the reaction of bauxite, commercial aluminum hydrate, or other acid soluble aluminous materials with sulphuric acid of 50–55° Bé. strength, with the addition of water or wash liquors, so that a neutral or basic solution of aluminum sulphate results which is subsequently boiled down to a condition of supersaturation and then permitted to solidify in large pans. This solid product contains from 16 to 18% of soluble alumina and from 40 to 45% of water, and is in the form of a glass-like solid solution, which, in contrast to the known crystalline hydrate of aluminum sulphate containing 18 molecules of water and about 15% of alumina, does not lend itself readily to dehydration to an anhydrous product.

Obviously it would be of decided advantage to both the consumer and producer of aluminum sulphate to be able to produce an anhydrous material from the commercial product prepared as described above. It has been found, however, that if an attempt is made to dehydrate commercial aluminum sulphate by heating, the material softens up to a semi-fluid sticky mass. Further heating only causes fluidity throughout with the exception of the top surface which is cooled to a temperature below the solidification point by evaporation. This results in the formation of a crust or film over the surface which increases the difficulty, both mechanically and thermally, of removing water vapor. This fluid, sticky melt also tends to adhere strongly to any metallic surface, and in the course of continued operation of the equipment will build up accretions of sulphate which require frequent removal; a factor of disadvantage in any commercial process, and especially so in this case where the deposited material is an extremely hard cement-like structure.

Numerous methods have been devised for overcoming the difficulties due to the physical characteristics of the solid solution formed commercially, but none of them has been entirely satisfactory. One method of treatment involves spray drying, or almost instantaneous dehydration of extremely fine droplets of concentrated aluminum sulphate solution in a suitable apparatus. The main disadvantage of this type of process is that the product which results from this spray evaporation is very bulky and voluminous, so that an appreciable amount of the economic advantage gained by the dehydration is lost. Other methods which have been employed are concerned with mechanical means for handling the semi-fluid to fluid mass which is formed as a result of heating the commercial product. That these methods possess certain inherent disadvantages is evidenced by the fact that anhydrous aluminum sulphate is not now produced commercially to any appreciable extent, if at all.

It is accordingly an important object of the present invention to provide a method for quickly and easily preparing an anhydrous aluminum sulphate product, which method is adapted to be used in connection with and sequentially to the usual method of making commercial aluminum sulphate, outlined above.

A further object of the invention is to provide a method for preparing anhydrous aluminum sulphate from solid hydrous aluminum sulphate as it is commercially prepared.

A further object of the invention is to provide a method of making an anhydrous product of the type described, which product may be of widely varying bulk or apparent density.

Still further objects and advantages of the invention will appear from the following description and appended claims. Before explaining in detail the present invention, however, it is to be understood that the invention is not limited in its application to the details described herein, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

According to the instant invention, commercial solid hydrous aluminum sulphate is added to anhydrous aluminum sulphate and intimately mixed therewith in the proper proportion to form a substantially homogeneous mixture in which the $Al_2O_3$ is present in the proportion of at least 22 to 23% by weight. This mixture may be readily dehydrated in the conventional type of equipment to form anhydrous aluminum sulphate, i. e., without encountering the semi-fluid sticky stage through which commercial aluminum sulphate normally passes on heating. Moreover, by varying certain steps of the procedure, we are able to obtain a product of varying density.

The solid hydrous sulphates obtained in accordance with the customary methods of making commercial aluminum sulphate usually contain from 15 to 18% of $Al_2O_3$. It is possible, however, also to treat the somewhat soft and plastic sulphates containing from 13 to 15% of $Al_2O_3$, and if desired, solid products containing as little as 10% of $Al_2O_3$ may be prepared and used in accordance with this invention. The latter products, when in the solid rather than liquid state, have the consistency of cream cheese.

The following is given as a specific example of one way in which this invention can be carried out. In a mixer such as a rotary conical cylinder rotating horizontally, sixty-two pounds of solid commercial hydrous aluminum sulphate containing about 17% of $Al_2O_3$ are added to one hundred pounds of anhydrous sulphate heated to a temperature sufficient to agglomerate the hydrous material. The mixing is carried out preferably at 120° to 160° C. The mixture will agglomerate but rather than form hard globular pellets, grape-like clusters will appear. The mixture is then calcined in a suitable rotating cylinder in which the end temperature is preferably maintained at 400° to 500° C. for three to four minutes in order to completely remove the water present in the mixture. A portion of the product is then recirculated to provide the anhydrous material used in the process. The clusters obtained will be found to be free flowing, non-caking, and very rapidly and completely soluble in water. These clusters are especially valuable when rapid and complete solubility of the anhydrous sulphate is important as in paper manufacture.

It has been found that the apparent density of the product may be varied by varying the conditions of operation. If a commercial solid sulphate containing about 42% $H_2O$ is used and the mixing is carried out at about 250° C. it will be found that the product swells greatly in the mixer and forms a very much more bulky anhydrous product. However, if the temperature of mixing is maintained as low as 80° C., although there is no unusual swelling in the mixer, unless the calcining operation is carried out extremely slowly, the pellets swell up to give the bulky product. Normal dense clusters are produced when the mixing is carried out at approximately 120-160° C. Thus, the apparent density of the final product may be varied from about .64, or even more, to about .19, or even less, by varying the temperature in the mixer. The bulky product is undesirable for most purposes, however, since it neutralizes to some extent the advantages of having an anhydrous product rather than the hydrous commercial product. Where products containing less water are used dense clusters are produced over a wider mixing temperature range.

The anhydrous aluminum sulphate and the hydrous solid material may be mixed in any desired proportions, provided that the percentage of $Al_2O_3$ in the final mixer product is not substantially less than 22% to 23%. Thus, even a starting ratio of hydrous sulphate to anhydrous which has an overall content of $Al_2O_3$ less than 22% to 23% may be employed, provided that the mixer is heated sufficiently to evaporate enough water to produce a final mixer product having at least the above percentage.

In order to obtain the proper agglomeration of the mixture, however, it is necessary that the hydrous solid sulphate which is added to the anhydrous material shall contain at least 30% $H_2O$ or that hot flue gases shall be introduced into the mixer to provide additional heat, or that the temperature shall be increased in other ways.

Instead of employing a rotary conical cylinder which rotates on a horizontal axis, as described in the above example, a screw conveyor or other similar mixing apparatus may be used. For most purposes, however, a rotary cylinder of the type described is entirely satisfactory.

The mixer and calciner may of course form one piece of apparatus with the mixer product being passed directly into the calciner section of the apparatus. If it is desired to operate on a continuous basis, anhydrous aluminum sulphate and the solid hydrous material may be continuously fed into the mixer in the proper ratio and the mixer product continuously passed through the calciner.

It has been found that when the final temperature of the calcination is not permitted to rise as high as 500° C. the resulting product is more quickly soluble than one which has been dehydrated at a temperature of 500° C. For example a top temperature of 400° C. forms a more quickly soluble product than a top temperature of 500° C. or more.

Although it is preferred that the anhydrous sulphate mixed with the hydrous material shall have been heated, this is not essential and if desired the materials may be mixed at normal temperatures, followed by a heating operation at a temperature chosen to give the desired type of product.

The use of the instant invention permits the production of anhydrous aluminum sulphate by a relatively easy and simple process which avoids the mechanical difficulties caused by passage through the semi-fluid, sticky stage previously considered inevitable. There is no need for the large solidification pans which have hitherto been required. The dehydration apparatus remains substantially free of concrete-like deposits which have characterized previous attempts to dehydrate the commercial sulphate. Moreover, by the proper choice of conditions a product of varying apparent density can be produced.

Where a small amount of water in the final aluminum sulphate product is not objectionable the final calcination may be carried out at lower temperatures. Likewise a material which is not strictly anhydrous may be used in carrying out this invention but in that case the proportion of hydrous sulphate added must be correspondingly restricted.

It is believed that the advantageous results of the present invention are due to a large extent to the fact that aluminum sulphate having an $Al_2O_3$ content above about 22 to 23% contains more $Al_2O_3$ than the minimum melting sulphate, which is known to contain only from 18 to 20% of $Al_2O_3$. Thus, by increasing the $Al_2O_3$ concentration above that of the minimum melting product in the manner described herein, it is possible to dehydrate the aluminum sulphate without any deleterious effects, as, once the $Al_2O_3$ concentration of the minimum melting product is surpassed, the melting point of the sulphate rises rapidly with further increases in $Al_2O_3$ content and decreases in water content. It should be kept in mind, however, that the advantages of this invention may be due equally as much to the formation of a crystalline hydrate having an $Al_2O_3$ content of about 22 to 23% and the property of lending itself readily to dehydration in common with the 18 $H_2O$ hydrate previously mentioned. In any case, anhydrous products are easily obtained from commercial aluminum sulphate by proceeding in the manner described herein.

This application is a continuation-in-part of my copending application, Serial No. 210,171, filed May 26, 1938.

In a copending application, Serial Number 348,204, filed July 29, 1940, there is described a method of preparing anhydrous aluminum sulphate by mixing an aqueous aluminum sulphate solution with anhydrous aluminum sulphate in an amount sufficient to form a product having at least about 22% $Al_2O_3$ and then driving off the water from the product to form an anhydrous sulphate. This is to be distinguished, however, from the method of the present invention, which relates to the use of solid hydrous aluminum sulphate instead of an aqueous solution of aluminum sulphate.

What is claimed is:

1. The method of producing anhydrous aluminum sulphate which comprises admixing anhydrous aluminum sulphate with solid hydrous and amorphous aluminum sulphate in an amount sufficient to produce a sulphate containing at least 22% $Al_2O_3$, and then dehydrating the resulting product to form an anhydrous sulphate.

2. The method of producing anhydrous aluminum sulphate which comprises admixing anhydrous aluminum sulphate with solid hydrous and amorphous aluminum sulphate containing at least 30% $H_2O$ in an amount sufficent to produce a sulphate containing at least 22% $Al_2O_3$, and then dehydrating the resulting product to form an anhydrous sulphate.

3. The method of producing anhydrous aluminum sulphate which comprises admixing anhydrous aluminum sulphate with solid hydrous and amorphous aluminum sulphate containing at least 30% $H_2O$ in an amount sufficient to produce a sulphate containing at least 22% $Al_2O_3$ and then dehydrating the resulting product at approximately 400° C. to form an anhydrous sulphate.

4. The method of producing anhydrous aluminum sulphate which comprises admixing heated anhydrous aluminum sulphate with solid hydrous and amorphous aluminum sulphate containing at least 30% $H_2O$ in an amount sufficient to produce a sulphate containing at least 22% $Al_2O_3$ and then dehydrating the resulting product to form an anhydrous sulphate.

5. The method of producing anhydrous aluminum sulphate which comprises admixing heated anhydrous aluminum sulphate with solid hydrous and amorphous aluminum sulphate containing at least 30% $H_2O$ in an amount sufficient to produce a sulphate containing at least 22% $Al_2O_3$ and then dehydrating the resulting product at approximately 400° C. to form an anhydrous sulphate.

6. The method of preparing anhydrous aluminum sulphate which comprises admixing heated anhydrous aluminum sulphate with solid hydrous and amorphous aluminum sulphate containing at least 30% $H_2O$ in an amount sufficient to produce a sulphate containing at least 22% $Al_2O_3$, said mixture being carried out in the presence of heated gases and then dehydrating the resulting product to form an anhydrous sulphate.

7. The method of producing anhydrous aluminum sulphate which comprises admixing heated anhydrous aluminum sulphate with solid hydrous and amorphous aluminum sulphate containing enough water to agglomerate the heated anhydrous aluminum sulphate upon being admixed therewith, said anhydrous aluminum sulphate being added in an amount sufficient to produce a sulphate containing at least 22% $Al_2O_3$, and then dehydrating the resulting product to form an anhydrous sulphate.

8. The method of preparing anhydrous aluminum sulphate which comprises admixing anhydrous aluminum sulphate with solid hydrous and amorphous aluminum sulphate containing at least 30% water at a temperature between approximately 80° and 250° C., said anhydrous aluminum sulphate being added in an amount sufficient to produce a sulphate containing at least 22% $Al_2O_3$, and then dehydrating the resulting mixture whereby an anhydrous product having the desired apparent specific gravity is obtained.

9. The method of preparing dense hard agglomerates of anhydrous aluminum sulphate which comprises rotationally admixing anhydrous and amorphous aluminum sulphate with solid hydrous aluminum sulphate in an amount sufficient to produce a sulphate containing at least 22% $Al_2O_3$, said solid hydrous aluminum sulphate containing at least 30% water and said mixing being carried out at a temperature of 120–160° C., whereby dense hard agglomerates are formed, and then dehydrating the resulting product to form an anhydrous sulphate.

10. The method of preparing a bulky anhydrous aluminum sulphate having a low apparent specific gravity which comprises admixing anhydrous aluminum sulphate with solid hydrous and amorphous aluminum sulphate in an amount sufficient to produce a sulphate containing at least 22% $Al_2O_3$, said solid hydrous aluminum sulphate containing at least 30% water and said mixing being carried out at a temperature below 120° C. and then dehydrating the resulting product to form an anhydrous sulphate.

11. The method of preparing a bulky anhydrous aluminum sulphate having a low apparent specific gravity which comprises admixing anhydrous aluminum sulphate with solid hydrous and amorphous aluminum sulphate in an amount sufficient to produce a sulphate containing at least 22% $Al_2O_3$, said solid hydrous aluminum sulphate containing at least 30% water and said mixing being carried out at a temperature above 160° C. and then dehydrating the resulting product to form an anhydrous sulphate.

12. The method of preparing dense hard agglomerates of anhydrous aluminum sulphate which comprises rotationally admixing anhydrous aluminum sulphate with solid hydrous and amorphous aluminum sulphate in an amount sufficient to produce a sulphate containing at least 22% $Al_2O_3$, said solid hydrous aluminum sulphate containing at least 30% water and said mixing resulting in the formation of agglomerates and being carried out at a temperature which does not cause substantial swelling of said agglomerates, and then dehydrating the resulting product to form an anhydrous sulphate.

WILLIAM S. WILSON.